UNITED STATES PATENT OFFICE 2,525,539

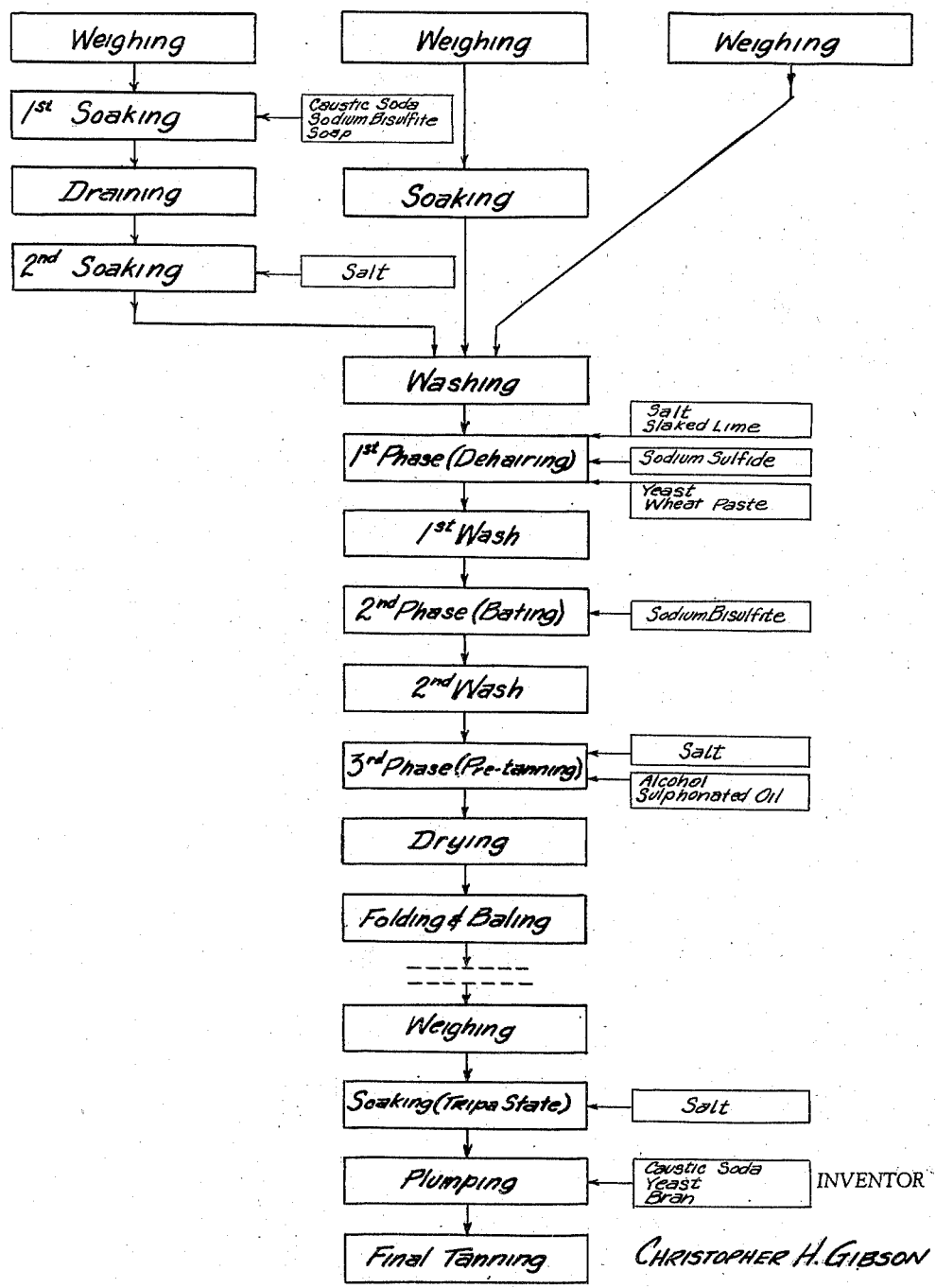

METHOD FOR PRESERVING HIDES AND PELTS

Christopher Herbert Gibson, Buenos Aires, Argentina

Application December 24, 1946, Serial No. 718,158

4 Claims. (Cl. 8—94.15)

The present invention has as its object the provision of a method for preserving hides and pelts to facilitate their subsequent tannage and, besides details of the ingredients used, comprises an actual preservation process, and a pre-tannage process.

Up to the present time, the preparation of hides and pelts, for example for export, has followed the classic systems of salting and pickling respectively. Those standard systems have a countless number of disadvantages which adversely affect production costs, transport, handling, pre-tannage operations, and the final tannage of the hides or pelts.

The comparison of the innumerable disadvantages of these old-fashioned systems with the progress which the present invention represents, clearly emphasizes the convenience of the same.

In effect, while the salting of a hide for export, for example, including all the current operations, requires a period of from 20 to 30 days, the preparation of the same hide by means of the process which I have invented only needs approximately 2¼ hours to 27 hours, while the product prepared in this manner is superior to the salted hide as will be shown.

It is a well-known fact that salted hides shrink in weight during transit or storage, require periodical and constant revision and, furthermore, deteriorate rapidly. Cattle hides prepared in accordance with the present invention possess exactly half the weight and half the volume of their wet-salted equivalents, while a sheep pelt prepared by the present invention represents 38% of the volume and 75% of the weight of its pickled equivalent in cask.

Thus, the bales which contain the hides (or pelts) processed in accordance with the present invention are extremely compact and represent an important economy with regard to handling and freight costs. They virtually do not shrink in weight during transit or storage, neither rats nor moths will attack them, they always remain free of mould, they possess no bad odor, they can be kept for an indefinite period of time in their dry baled state without any deterioration whatsoever, and changes of climate and/or temperature do not affect them. Furthermore, they are considered as "clean cargo" with the consequent advantages of handling and storage.

A further advantage to the present invention is that the tanner who receives hides processed in this manner, receives a product which contains 100% leather substance whatever its weight may be.

Another of the advantages of the present invention is that the tanner who receives the hides prepared in accordance with the same, does not have to effect special preliminary operations, known as liming and beam house operations, in order to classify the hides according to quality. In the hide's dry dehaired state, the tanner can judge at a glance its defects, such as barbed-wire scratches, tick marks, etc.

Yet another advantage, and perhaps the most important of all, is that hides processed by the present invention do not have to be subjected to the operations known as liming and beam house, inclusive of bating, which, as is well known, take up a lot of time and represent heavy labor costs owing to their unsanitary character.

The rapidity of the method which I have invented prevents any possibility of putrefactive action from taking place in the hides, either during the treatment or during the pre-tannage operations.

Finally, hides and pelts processed in accordance with this invention permit the production of a finished article of excellent quality, owing to the fact that neither the grain nor the fiber is in any way damaged.

Other advantages of my invention will become apparent from the following description, reference being made to the accompanying drawing in which the single figure shows a flow chart of my process.

If the hides to be processed in accordance with the present invention are salted or dry, they must first be submitted to a pre-phase in order to make them revert to green state. Taking as our basis a salted hide, it must first be weighed and then soaked for 12 hours in clean water in the same rotating drum in which subsequent operations will be carried out. At the end of the soakage period the hide is washed for 5 minutes with water at a temperature of from 28°–32° C. in order to eliminate the salt, dirt, etc. The hides must remain covered with water at the same temperature, which is graduated by means of steam.

I then add 1.5% of salt and from 1.4% to 2.8% of slaked lime (according to the strength of the sodium sulphide, the latter must always be twice as much as the former), and set the drum in motion at a speed of from 18 to 20 revolutions per minute, immediately adding 2.8% to 5.6% sodium sulphide (according to its strength), all these and following percentages being based on the salt weight of the hides. At the end of 20 minutes, I stop the drum and add 1 per mil of yeast and 5% of a sub-product of wheat, and again run the drum for a further 20 minutes. At the end of this first phase, the hides are washed for 20 minutes with a plentiful flow of water at from 28°–32° C., the flow being closed 1 minute before the end of the washing. The second phase consists of adding 2.5% of sodium bi-sulphite (solid form), and running the drum for 30 minutes. At the end of this second or bating phase, the hides receive a second washing of 10 minutes with water at a temperature of from 28°–32° C., the flow being cut 1 minute before ending. In the third or last phase, I add 1.7% of salt and set the drum in motion, immediately adding 0.05% of an alcohol and 0.1% of a sulphonated oil and, in cases where the hides are to be subsequently vegetable-tanned (as opposed to chrome tannage), 1.33% of sodium bi-sulphite and 1% of an acid, the period of this phase being 30 minutes. Upon completion the hides are dried, folded and baled for remission to the tanners.

Ordinary dry hides which are to be processed in accordance with this invention, must first be submitted to the following treatment. After being weighed, the hides are placed in a pit or vat to soak for 24 hours in clean water, to which is added a solution of 0.04% of caustic soda, 0.04% of sodium bi-sulphite, and 0.04% of a soap, of the dry weight of the hides. The hides are then folded over stands to drain for 15 minutes. Thereafter, they are placed in the rotating drum, covered with water at from 28°–32° C. to which 1.5% of salt of their estimated salt weight is added, the drum being run for 30 minutes for this second (final) soakage. The hides are then washed for 5 minutes; and from this point the process is commenced as from the opening of the preceding paragraph with the first "dehairing" phase. The percentages of ingredients must always be based on the estimated salt weight of the hides.

In the case of fresh hides straight off the killing floor which are to be processed by this invention, they are weighed, washed and pass directly to the first dehairing phase, the percentages of ingredients always being based on the estimated salt weight of the hides.

Upon arrival at the tannery, the dry baled hides are submitted to a pre-tannage process which lasts 5½ hours. After being weighed, the hides are placed in a rotating drum and just covered with water at 38° C. to which 5% of salt of their dry weight is added. The drum is then run for 150 minutes at 18 to 20 revolutions per minute, causing the hides to revert to "tripa" state. In the second or "plumping" step, I add 1.5% of caustic soda of the dry weight of the hides and from 2% to 4% of a yeast and from 2% to 5% of a grain covering according to the plumping requirements of each individual tanner, the drum being run for 180 minutes. At the end of this period, the hides will be in condition for the final tanning, each individual tanner being able to employ his customary methods.

The present invention and the manner in which it is carried out in practice having been described, what I claim is:

1. A method of preserving cattle and sheep hides comprising introducing the hides into a rotary drum, washing them with water at a temperature of about 28 to 32° C., adding about 1.5% salt and from about 1.4 to 2.8% of slaked lime, rotating the drum, immediately adding 2.8 to 5.6% sodium sulfide, stopping the rotation of the drum at the end of twenty minutes, adding 1 per mill of a yeast and 5% of wheat waste, rotating the drum for about 20 minutes, washing the hides with water at a temperature of about 28 to 32° C. for about 20 minutes while rotating the drum by introducing a stream of the water into the drum, stopping the flow of water about 1 minute prior to termination of the washing step, adding about 2.5% sodium bisulfite, rotating the drum for about 30 minutes, and then washing the hides with water.

2. A method of preserving cattle and sheep hides comprising introducing the hides into a rotary drum, washing them with water at a temperature of about 28 to 32° C., adding about 1.5% salt and from about 1.4 to 2.8% of slaked lime, rotating the drum, immediately adding 2.8 to 5.6% sodium sulfide, stopping the rotation of the drum at the end of twenty minutes, adding 1 per mill of a yeast and 5% of wheat waste, rotating the drum for about 20 minutes, washing the hides with water at a temperature of about 28 to 32° C. for about 20 minutes while rotating the drum by introducing a stream of the water into the drum, stopping the flow of water about 1 minute prior to termination of the washing step, adding about 2.5% sodium bisulfite, rotating the drum for about 30 minutes, then washing the hides with water for about 10 minutes, adding 1.7% of salt, rotating the drum, immediately adding 0.05% of an alcohol and 0.1% of a sulphonated oil, and continuing rotation for about 30 minutes.

3. A method of preserving cattle and sheep hides comprising introducing the hides into a rotary drum, washing them with water at a temperature of about 28 to 32° C., adding about 1.5% salt and from about 1.4 to 2.8% of slaked lime, rotating the drum, immediately adding 2.8 to 5.6% sodium sulfide, stopping the rotation of the drum at the end of twenty minutes, adding 1 per mill of a yeast and 5% of wheat waste, rotating the drum for about 20 minutes, washing the hides with water at a temperature of about 28 to 32° C. for about 20 minutes while rotating the drum by introducing a stream of the water into the drum, stopping the flow of water about 1 minute prior to termination of the washing step, adding about 2.5% sodium bisulfite, rotating the drum for about 30 minutes, then washing the hides with water for about 10 minutes, adding 1.7% of salt, rotating the drum, immediately adding 0.05% of an alcohol and 0.1% of a sulphonated oil, continuing rotation for about 30 minutes, and then drying the so treated hides.

4. A method for preserving hides, in accordance with claim 3, and further comprising weighing the dry baled hides, placing them in a rotating drum and just covering them with water at 38° C. to which 5% of salt of their dry weight is added, then running the drum for 150 minutes at 18 to 20 revolutions per minute which causes the hides to revert to "tripa" state, adding 1.5% of caustic soda of the dry weight of the hides, and from 2% to 4% of a yeast and from 2% to 5% of a bran, and then running the drum for 180 minutes.

CHRISTOPHER HERBERT GIBSON.

(References on following page)

REFERENCES CITED

The following references are of record in the file of this patent:

UNITED STATES PATENTS

| Number | Name | Date |
|---|---|---|
| 58,643 | Hersey | Oct. 9, 1866 |
| 66,294 | Brown | July 2, 1867 |
| 798,293 | Oakes | Aug. 29, 1905 |
| 1,003,124 | Rohm | Sept. 12, 1911 |
| 1,210,968 | Nasse | Jan. 2, 1917 |
| 1,310,749 | Glasel | July 22, 1919 |
| 1,735,977 | Rohm | Nov. 19, 1929 |
| 1,822,898 | Maquire | Sept. 15, 1931 |
| 1,967,679 | Muench | July 24, 1934 |
| 2,033,163 | Wallerstein | Mar. 10, 1936 |
| 2,105,036 | Freudenberg et al. | Jan. 11, 1938 |
| 2,225,601 | Pfannmuller | Dec. 17, 1940 |

FOREIGN PATENTS

| Number | Country | Date |
|---|---|---|
| 236,483 | Great Britain | of 1925 |

OTHER REFERENCES

"Practical Tanning" by Flemming, H. C. Bairs & Co., 2nd edition, 1910, revised; pages 1–14, 372, 412.

"Manufacture of Leather" by Davis, Henry Carey Barrd & Co., published 1885; pages 359 and 360.